United States Patent [19]

Bushey

[11] Patent Number: 4,678,505

[45] Date of Patent: Jul. 7, 1987

[54] PROCESS FOR FORMING SOLID SOLUTIONS

[75] Inventor: William R. Bushey, Wilmington, Del.

[73] Assignee: E. I. Du Pont de Nemours and Company, Wilmington, Del.

[21] Appl. No.: 931,958

[22] Filed: Nov. 24, 1986

Related U.S. Application Data

[63] Continuation of Ser. No. 802,029, Nov. 25, 1985, abandoned, which is a continuation-in-part of Ser. No. 645,425, Aug. 29, 1984, abandoned.

[51] Int. Cl.$^4$ ................................................ C22B 5/00
[52] U.S. Cl. .................................. 75/0.5 A; 75/108; 75/109; 75/118 R; 501/19; 361/305; 423/592; 423/593; 423/604; 423/617; 423/619; 423/621; 429/40; 252/518
[58] Field of Search ..................... 75/0.5 A, 108, 109, 75/118 R, 129; 501/19; 361/305; 423/592, 593, 604, 617, 619, 621; 429/40; 252/518

[56] References Cited

U.S. PATENT DOCUMENTS

| | | | |
|---|---|---|---|
| 3,390,981 | 7/1968 | Hoffman | 75/108 |
| 3,427,153 | 2/1969 | Venkatesan et al. | 75/108 |
| 3,620,713 | 11/1971 | Short | 75/0.5 A |
| 3,717,453 | 2/1973 | Daigci | 75/0.5 A |
| 3,930,093 | 12/1975 | Short | 501/19 |
| 4,075,681 | 2/1978 | Popowich | 361/305 |
| 4,129,525 | 12/1978 | Horowitz et al. | 429/40 |
| 4,176,094 | 11/1979 | Horowitz et al. | 429/40 |
| 4,192,780 | 3/1980 | Horowitz et al. | 429/40 |
| 4,203,871 | 5/1980 | Horowitz et al. | 429/40 |
| 4,225,469 | 9/1980 | Horowitz et al. | 429/40 |
| 4,420,422 | 12/1983 | Ferretti et al. | 423/593 |
| 4,426,356 | 1/1984 | Nair | 361/305 |

*Primary Examiner*—John Doll
*Assistant Examiner*—Robert L. Stoll

[57] ABSTRACT

A continuous process for making a solid solution of two or more metals or metal oxides by ionic reaction and coprecipitation during high intensity mixing.

12 Claims, No Drawings

PROCESS FOR FORMING SOLID SOLUTIONS

CROSS REFERENCE TO RELATED APPLICATION

This application is a continuation of application Ser. No. 802,029, filed 11/25/85, now abandoned, which is a continuation-in-part of U.S. patent application Ser. No. 645,425 filed Aug. 29, 1984 now abandoned.

FIELD OF INVENTION

The invention relates to a process for forming solid solutions and, in particular, to a process for making solid solutions in finely divided form.

BACKGROUND OF THE INVENTION

Though the process of the invention has wide application for making virtually an infinite variety of solid solutions, it was developed initially for the purpose of providing a reliable and economic source of finely divided, uniformly sized particles of true solid solutions for use in making monolithic capacitors.

Monolithic capacitors comprise a plurality of dielectric layers, at least two of which bear metallizations (electrodes) in desired patterns. Such capacitors are made by either the "green tape" process or by the the thick multilayer process. In the former, multilayer capacitors are made from a green (unfired) tape of particles of dielectric materials held together with an organic binder by cutting pieces of tape from a sheet of tape, metallizing some of the tape pieces, stacking and laminating the pieces of tape, cutting the laminate to form individual capacitors and firing the resultant individual capacitors to drive off the organic binder and vehicles and to form a sintered (coherent) body. In the latter method, multilayer capacitors are made by printing and drying alternating layers of thick film conductor materials and dielectric material in a desired configuration on a rigid ceramic substrate such as $Al_2O_3$. The sequence of steps is repeated until the desired number of capacitor layers is fabricated. The dried stack of capacitor layers is then fired in the same manner as the green tape to effect densification of the dielectric material.

Metallizations useful in producing electrodes for capacitors usually consist of finely divided metal particles applied to the dielectric green tapes in the form of a dispersion of such particles in an inert liquid organic medium or vehicle. Selection of the composition of the metal particles is usually based on a compromise of cost and performance. Since base metals often are oxidized in air at elevated temperatures and/or in many cases react with the dielectric material during firing, noble metals are usually preferred because of their relative inertness during firing of the laminates to produce electrically continuous conductors. By far the most widely used monolithic capacitor electrode materials have been palladium and mixtures of finely divided palladium and silver powders which become alloyed during firing.

In the fabrication of multilayer capacitors, the required solidus temperature of the electrode metal will ordinarily be determined by the sintering temperature of the dielectric material on which it is applied. In turn, the sintering temperature is determined by the physical and chemical characteristics of the dielectric material. Thus, to prevent excessive diffusion of the conductive metal into the dielectric layer during sintering, it is preferred to employ a metal or solid solution of metals having a solidus temperature higher than the firing temperature and preferably at least 50° C. higher.

Silver would most frequently be the noble metal electrode material of choice because it has both suitable conductive properties and the lowest cost of the noble metals. However, when used in capacitors, the electrode material is subjected to firing temperatures of 1100° C. or even higher. These temperatures are necessary for most state-of-the-art dielectric materials to be sufficiently sintered to obtain suitable densification and dielectric properties. Because metallic silver melts at only about 961° C., silver metal alone would melt completely at 1100° C. or higher and be of such low viscosity that it would too readily diffuse into the dielectric material and thus substantially degrade the capacitor properties of the sintered dielectric material. For this reason, it is preferred to employ a solid solution of palladium and silver which has a suitably high solidus temperature that it cannot migrate significantly into the dielectric material at normal firing temperatures. This solid solution or alloy is best provided as an already formed Pd/Ag alloy for the reason that any unalloyed silver would be available to migrate into the dielectric layer.

As a result of the above considerations, for those X7R and NPO class capacitors which are fired at 1100°, a 30/70 Pd/Ag mixture is used. On the other hand, for a Z5U class capacitor which is fired at 1450° C., a 70/30 Pd/Ag or 100 Pd mixture is used as the noble metal component. In general, the ratio of palladium to silver is dependent upon the maximum firing temperature which is used to densify the dielectric material to a well sintered body.

The particles of the metal component of the metallization should be sufficiently small that the paste can be used even in conventional screen printing operations and that the particles can be readily sintered. Furthermore, in the production of capacitors from green dielectric sheets, the presence of coarse particles in the inner electrode prints must be avoided lest they cause puncturing of the green dielectric sheets. Generally, the metallizations are such that at least 90% of the noble metal particles are no greater than 8 microns in diameter; that is, in general their largest dimension should be no greater than 8 microns. However, when the thickness of the green dielectric layer is less than 1 mil, the particles must be correspondingly smaller.

The problem of making such particulate material as true solid solutions is illustrated quite graphically by reference to U.S. Pat. No. 3,390,981 to Hoffman. Based on a U.S. patent application filed in 1963, the patent purports to cover a process for producing solid solution particles of two noble metals by treating a solution of the metals with a reducing agent capable of simultaneously reducing the metal constituents to the corresponding metals. The process was carried out with at most mild agitation (rapid stirring, Example 1) and slow addition of reductant. By virtue of a particularly described melting point determination, it was concluded that the particles therefrom were solid solutions. However, modern x-ray diffraction studies of products made in accordance with the teaching of the reference show separate Ag and Pd peaks, which indicate a mixture of the two metals and not a true alloy or solid solution. It has since been shown that the melting points obtained as described in the reference were the result of formation of a solid solution during the melting point test itself (See col. 5, lines 17–23 of the reference). Also of interest is U.S. Pat. No. 3,717,453 to Daiga which is directed to a method of forming an "homogeneous powder" of Ag, Au and another metal by coprecipitation of Ag and the other metal and then precipitating the Au from a slurry of coprecipitated Ag and other metal. The reference also discloses an alternative method which involves forming a solution of Ag and the other metal, adding Au powder and then precipitating the Ag and other metal from a slurry of the Au powder. While the Daiga process sometimes results in alloy formation, the process is neither intended to nor does it result in uniform alloy formation.

BRIEF DESCRIPTION OF THE INVENTION

The invention is therefore directed to a process for forming a solid solution of two or more metals or metal oxides by ionic reaction and simultaneous precipitation from the reaction medium comprising the steps of:

A. In a high intensity mixing apparatus, forming a microdispersion of (1) an aqueous liquid ionic solution of the metals and (2) at least a stoichiometric amount relative to the dissolved metal ions of a reactant fluid which is soluble in the aqueous solvent for the metals to effect complete liquid phase reaction between the metal ions and the reactant fluid and formation in the liquid phase of the metals or metal oxides, the rate of forming the microdispersion being faster than the ionic reactions and therefore sufficient to avoid precipitation of solids therefrom before completing the microdispersion;

B. Simultaneously adjusting the pH of the microdispersion to maintain the reaction of the metal ions at a rate faster than the rate of precipitation of metals or metal oxides from the reaction medium;

C. Maintaining the microdispersion for a time sufficient to effect simultaneous precipitation of the formed metals or metal oxides and formation of finely divided particles of a solid solution of the metals or metal oxides and dispersion in the reaction medium of the finely divided solid solution particles;

D. Removing reaction medium containing the dispersed solid solution particles from the mixing apparatus; and E. Separating the particles of solid solution of the metals or metal oxides from the removed reaction medium.

THEORETICAL CONSIDERATIONS

The formation of true alloys of metals and other solid solutions by precipitation is an inherently difficult process. For an alloy to form, all constituents of the alloy must be simultaneously available for precipitation in the correct proportions in the correct oxidation state.

To illustrate this, in Examples 2–4, palladium (II) nitrate and silver (I) nitrate are added to the reactor. However, the solid alloy that is precipitated is made of palladium metal and silver metal in the zero oxidation state. Thus, the composition of the solid alloy is determined by the ratio of dissolved palladium (0) to dissolved silver (0) at the time of precipitation. Since metals in the zero oxidation state are highly insoluble, the atomic dissolved metal must be constantly replenished by reducing metals in higher valence states to the zero state. The ratio of concentration of metals in these non-precipitating higher oxidation states does not determine whether an alloy of the metals can be formed or, if the alloy is formed, what the ratio of the component metals will be. Only the ratio of zero valent metals does that. Therefore, when the formation of the precipitating species is rate limiting, an absolute, requirement for the formation of solid solutions is that the process which changes the oxidation state of the metals from the soluble state to the precipitating state must do so in a manner which gives the correct alloy proportions. If it is assumed that the composition of the solid solution should have the same ratio as the soluble salt concentration, the steady-state rates of formation for each component must be substantially the same since the rate of precipitation is governed by the rate of formation of the zero valent state (i.e., the change in oxidation state is the rate-limiting step). This is difficult to achieve in practice. The reason for the difficulty is that formation of precipitating species is dependent on the concentration of the soluble species, the pH and the co-reactant. Since the co-reactant is rarely equally reactive to both the soluble species, the relative reactivity would be determined by the ratio of the concentration of the soluble metal species. This is summarized by equation (1) below wherein $$\text{Rate A/Rate B} = C_a^{na}/C_b^{nb} \tag{1}$$

Ca and Cb are the concentrations of A and B and na and nb are the reaction orders of A and B, respectively, in the rate equation. The requirement is that Rate A=Rate B. (If Rates A and B differ by a small amount, it will then be expected that the resultant composition will deviate accordingly.) Therefore, a necessary consequence of the formation of the precipitating species being the rate-limiting step is that the alloy can only be formed at one specific ratio of metal concentration for any given single reductant. Furthermore, as in the case of palladium and silver and most other metal combinations whose soluble state have different oxidation states, if one of the metals reacts very much faster than the other, the alloy forms in unuseful ratios of 100 or 1000 to one or greater. If one tries to make an alloy using concentrations whose composition ratio does not equal the rate ratio, then two phases are formed.

For example, if a solution containing 30% palladium and 70% silver by weight of total metal is used with formaldehye as a reductant, one will first precipitate an essentially pure palladium phase because palladium (II) as a two-electron oxidizing agent will react much faster with the two-electron reducing agent (formaldehyde) than will the one-electron oxidizing agent silver (I). The essentially pure silver phase will then precipitate next. It should be noted that the purity of the two phases is governed by the relative rates of reduction and only appear pure to normal x-ray alloy analysis because the rate of reduction of palladium (II) is so much faster than the reduction of silver (I).

If the production of the precipitating state is the rate-limiting step, one could use more than one reactant as illustrated in equations 2, 3, 4 and 5, where A and B are the soluble forms, $P_a$ and $P_b$ are the precipitating forms, and R1 and R2 are reactants which react at different rates for a given component.

$$B + R2 \xrightarrow{\text{Fast}} P_b \qquad (5)$$

In such a system, the alloy composition could be governed by the ratio of R1 and R2 as well as the ratio of A and B. If R1 reacts only with A and R2 reacts only with B, the calculations are simplified; but as long as R1 reacts faster with A and R2 reacts faster with B, the whole range of alloy composition could in theory be obtained. But to find such a pair of reactants and to maintain such high standards of purity would be virtually impossible. However, it has now been found that such rigorous matching of reactants and maintaining such high purity is not necessary when the process of the invention is used to make solid solutions by co-precipitation. The process of the invention is based upon the following principles.

Any precipitation process can be described by two distinct reactions illustrated in equation (6) and (7) where $$\text{Formation: RED} + \text{Ag(1)} \rightarrow \text{Ag(0)} + \text{OX} \qquad (6)$$

$$\text{Nucleation: Ag(0)}_{aq.} \rightarrow \text{Ag(0)}_s. \qquad (7)$$

Equation 6 is the formation of the precipitating species during a reduction reaction using reducing agent RED and equation 7 is the nucleation and precipitation of the dissolved precipitating species, $\text{Ag(0)}_{aq.}$ to form the solid. As shown in equation (6), if formation is the rate-limiting step, then the above discussion applies. But, as shown in equation (7), if nucleation is the rate-limiting step, then the rate of formation of solid becomes independent of the concentration of reductant or silver (1). If two metals are present and nucleation is the rate-determining step, then the rate of precipitation is independent of the concentration of soluble species. Therefore, an alloy can be formed regardless of the ratio of the two soluble species and regardless of the relative rates of formation. The traditional method to shift the rate-limiting step from one reaction to a second serial reaction is to increase the speed of the first reaction until it is much faster than the second. Hence, the rate of formation of product becomes only as fast as the second reaction.

The use of these principles to make a binary alloy is shown below:

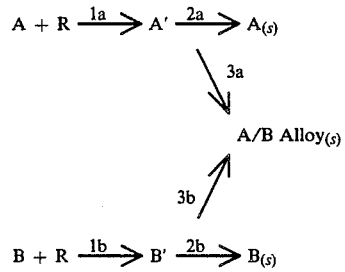

The soluble species A and B react with reductant R at rates 1a and 1b respectively to form the precipitating species A' and B'. Assuming 1a and 1b are very fast, then at some point very soon after mixing the reactants, the species in solution are the precipitating species A' and B', i.e., the ratio of the concentration of the precipitating species, is identical to the ratio of the soluble species because rates 1a and 1b are so much faster than the precipitating rates 2a which forms pure solid A, 2b which forms pure solid B and rates 3a and 3b which form the alloy, that essentially no precipitate of any type has yet formed. At this point of the reaction, the precipitating species can either co-precipitate as an alloy via reactions 3a and 3b or precipitate as pure phases via 2a and 2b. The path a given reactant scheme takes is determined by the relative activation energy of crystallization of the pure phase versus the alloyed phase. Although this ratio can be adjusted by seeding and/or by complexing the precipitating species, in the case of metals which form binary alloys, the activation energies are essentially equal within experimental verification.

The base concentration during the formaldehyde reduction of the metals can be increased to raise pH, which in turn increases rates 1a and 1b and thus make the precipitation reactions 3a and 3b rate-limiting. Under these conditions, even though palladium reduction is still much faster than silver reduction, they are nevertheless both much faster than the nucleation step. The rate of nucleation is similar for both metals. This results in precipitation of a true alloy, something not uniformly attainable under typical reaction conditions.

The concept of adjusting the rates of formation to make them much faster than the rate of nucleation has been illustrated above using a reduction sequence. The process of the invention is not, however, limited to oxidation/reduction systems. For example, in the formation of solid solutions of metal oxides by precipitation, the formation reaction could be an acid/base neutralization since the aquo complex of most metals is soluble, whereas the hydroxo form is the precipitating species. The only requirement is that the formation step be sufficiently accelerated by the addition of an outside agent such as a base to change the rate-limiting step from formation of the precipitating species, i.e., the hydroxo form, to nucleation and precipitation of that form.

DETAILED DESCRIPTION OF THE INVENTION

The process of the invention can be used to make almost any solid solution of metals or metal polymeric oxides so long as as the following conditions can be met:

(1) it must be possible to prepare aqueous solutions of the metal ions;

(2) the ions of both metals must react with a common reactant system to form their respective precipitation species;

(3) the kinetics of the reactions which produce the precipitating species must be similar. That is, the reaction rates must be affected similarly by the same variables;

(4) both reactions must be sufficiently pH-sensitive that the reaction rate of each can be adjusted to be faster than the precipitation of each species. In other words, the precipitation must become the rate-controlling step for both reactions; and (5) the rate of both reactions must nevertheless be slower than the rate at which the microdispersion of the reactants is formed. This requirement, of course, influences the choice of the high intensity mixing apparatus for use in the invention.

Typical metallic solid solutions for which the invention is likely to be used include Pd/Ag, Rh/Ag, Pd/Cu, Pd/Pt, Pd/Ni, Cu/Ag and Pt/Au.

Among the other useful applications of the process of the invention is the preparation of polynary oxide compounds which are frequently used as the resistance component of thick film resistors. These materials include pyrochlore-type compounds such as ruthenates of Bi and Pb. Such materials are usually made by firing an admixture of the metals and/or metal oxides. However, they can be made more reliably and economically by the process of the invention which requires no high temperature processing. Similarly, the complex bismuth iridates and ruthenates of U.S. Pat. No. 3,583,931 can also be made by the process of the invention. It will be recognized by those skilled in the art that the invention is limited to those proportions of metals and metal oxides which form at least solid solutions and/or compounds. It will be recognized that in most instances any water-soluble compound of the metals or metal oxides can be used such as halides, nitrates and the like. However, it should be noted that chlorides must not be used in making silver-containing alloys because they cause precipitation of the silver as an insoluble salt.

As used herein, the term "solid solution" refers to a substitutional solid solution in which atoms of the solute metal (or oxide) become part of the space lattice of the solvent metal (or oxide), i.e., they take the place of some of the solvent atoms at lattice sites.

In some instances, the process of the invention may produce meta-stable solid solutions or glasses which can be stabilized by sintering to facilitate rearrangement of the atoms to a stable form. In general, the molar proportion of the metals or metal oxides in the process corresponds to their soluble proportions. It is not recommended to use an excess of any metal or metal oxide since it will be precipitated along with the desired alloy and act as an impurity in admixture with the desired solid solution. Therefore, it is preferred to employ the ionic solutions in approximately the same molar proportions as the solid solution which is sought. Thus, if a 70/30 Ag/Pd solid solution is sought, the molar proportions of the Ag and Pd ion solution should be substantially 70/30 also. The proportions of most metals that form solid solutions are readily available in the published literature.

Because the process of the invention is an ionic phenomenon, the preferred solvent for the ions is water. However, other water-compatible solvents can be used therewith, such as low molecular weight alkanols and glycols. Others will be apparent to those skilled in the art of ionic systems.

The ionic reactions which will be used in the process of the invention are pH sensitive. In particular, the reaction rate can be raised by increasing pH or lowered by decreasing pH. In general, it is preferred to use lower reaction rates which yield larger particles than those obtained at higher reaction rates. Nevertheless, the ionic reaction rate must still be sufficient that the precipitation of the solid solution is clearly the rate determining step. Thus, in any given reaction system, the operating pH necessary to assure the formation of solid solutions is that which allows the nucleation and precipitation to become rate-limiting as opposed to the formation of the precipitating species.

Though heating the reaction system may increase the reaction rate somewhat, it is usually neither necessary nor preferred to heat the reactants or the reactor. Moreover, the heat of neutralization generated during the process is usually sufficient to raise the reaction temperature moderately to on the order of 70°-80° C.

To adjust the pH upward for the purpose of maintaining the reaction rate sufficiently high, it is preferred to add a strong base. Because smaller volumes of base are required, the volume of fluids which must be mixed is reduced. It is preferred that the strong base have a pKa value of 11 and preferably 14. Preferred bases for this purpose are NaOH and KOH. Sodium carbonate can be used also; however it is not preferred because of its evolution of gas in the process. Ammonium hydroxide is not recommended in most instances because it is not strong enough and in some instances may form undesirable complexes and other by-products.

The reactant material which coreacts with the dissolved ions to form the insoluble species will vary widely depending upon the particular chemical reactions involved. In the coprecipitation of metals as well as metal oxides, either oxidation or reducing agents may be used in any particular system. On the other hand, acid/base reactions not involving oxidation or reduction of the metals may be used in forming solid solutions of metal oxides. However, in the case of coprecipitating metals, the reactant fluid will frequently be a reductant material (reducing agent) or a combination of reductants. This is illustrated in the following table which lists several noble metal alloy systems and the reductant pairs which can be used to produce them in the process of the invention:

TABLE 1

REDUCTANT PAIRS FOR NOBLE METAL SOLID SOLUTIONS

| Solid Solution Composition | Reductant Composition | |
| --- | --- | --- |
| Pd/Au | For Pd<br>Hypophosphorous Acid<br>Sodium Hydrosulfite | For Au<br>Hydroquinone<br>Hydrazine Sulfate<br>Sulfurous Acid<br>Sodium Sulfite<br>Ferrous Sulfate |
| Pt/Au | For Pt<br>Sodium borohydride<br>Sodium hydrosulfite | For Au<br>Hydroquinone<br>Hydrazine Sulfate<br>Sulfurous Acid<br>Sodium Sulfite<br>Ferrous Sulfate |
| Pd/Ag | For Pd<br>Sodium Borohydride<br>Hypophosphorous Acid<br>Hydroquinone | For Ag<br>Sodium Formate<br>Ammonium Formate<br>Hydroxylamine<br>Formic Acid<br>Hydrazine Sulfate<br>Tartaric Acid |

As indicated in the above summary, it is necessary that the reactant liquids be mixed very rapidly to form a microdispersion and that the rate of forming and degree of microdispersion and must be sufficient to avoid any substantial precipitation of solids before the microdispersion is complete. Such microscale (diffusive) mixing must therefore be accomplished faster than the reaction rate of the reactant materials. The reaction time of ionic reactants of the type used in the invention are typically on the order of only a few milliseconds; therefore, they require extremely rapid mixing.

To form the required microdispersion of reactant liquids with sufficient rapidity, it is necessary to use high intensity mixing apparatus. As used herein, the term high intensity mixing apparatus or high intensity mixer refers to those devices which exhibit very high energy dissipation rates, such as on the order of 1000 HP per 1000 gallons (ca. 200 Joules/sec./liter) or higher. Typical mixers of this type are Waring ® blenders, jet mixers, multiple jet mixers and side-T mixers. Others will be apparent to those skilled in the mixing art.

As mentioned above, it is also necessary that the microdispersion be maintained for a time sufficient to avoid any precipitation of separate metal species. Ordinarily this will be a matter of only a fraction of a second and therefore no separate operational step is required. Nevertheless, in situations where the precipitation step is quite slow, it may be necessary to adjust the rate of product offtake to allow sufficient residence time in the microdispersed state.

After removing the precipitated reaction product from the reactor, it is necessary to separate the solid solution particles from the reaction medium and by-products. Such solid-liquid separations can be accomplished quite easily be centrifugation and/or filtration methods which are well known in the unit operations arts. Drying of the separated particles can be accomplished by conventional means such as by solvent extraction and/or heating in air.

Depending on the particular metals being used in the process, the solid solution particles produced are quite small and have a surface area of 15–25 m$^2$/g. Because the particles tend to be so small, they also tend to agglomerate and to result in dispersions which may vary in viscosity. It has been found, however, that the surface area of the particles can be reduced to on the order of 1–10 m$^2$/g by heating them to 300°–500° C. for 1–16 hours. Higher temperatures can be used so long as the melting point of the solid solution is not exceeded. Thick film conductor pastes containing particles treated in this manner not only have better viscosity stability but also thick film conductors made therefrom have better delamination resistance.

The process of the invention is likely to be most advantageous when carried out on a continuous basis. However, it can also be carried out on semicontinuous or even a batch basis.

The invention will be better understood by reference to the following examples. In the examples, particle size determinations were made by sedimentation techniques using the Sedigraph 5000D particle size analyzer. Sedigraph is a tradename of the Micromeritics Instrument Corp., Northcross, GA., USA.

EXAMPLE 1

Prior Art Process

An attempt was made to synthesize a palladium silver alloy containing 1:1 weight ratio of palladium and silver via the method taught in U.S. Pat. No. 3,390,981. The procedure was as follows.

Fifty mL of concentrated commercial grade nitric acid was added to a 600 mL beaker containing 100 mL of deionized water. Twenty-five g of fine palladium powder and 0.5 g of NaNO$_2$ were added. The solution was stirred and heated to 50° C. until all powder was dissolved. After all the powder is dissolved, the solution was transferred to a 4 L beaker equipped with a stirrer and an addition funnel. Four solutions were then prepared. Solution A was prepared by dissolving 256 g of ammonium nitrate in 280 mL of H$_2$O. Solution B was prepared by adding 39.4 g of silver nitrate in 150 mL of H$_2$O. Solution C was prepared by measuring out 125 mL of concentrated ammonium hydroxide and Solution D was prepared by measuring 130 mL of hypophosphorous acid into the addition funnel.

The palladium nitrate solution was neutralized in the beaker by adding ammonium hydroxide. The reaction was cooled to room temperature and then Solution A was added with stirring. After 1 minute, Solution B was added. After 2 minutes of elapsed time, Solution C was added. After 3 minutes of elapsed time, 5 mL of Solution D was added. Thereafter, the rest of Solution D was slowly added over the course of 30 minutes. The precipitate was then washed by decantation five times, filtered, and dried overnight at 60° C.

An x-ray diffraction pattern was taken of this material using CuK$\alpha_1$ radiation. Peaks were observed at 38.01° and 43.14° as well as 40.06° and 46.58°. These peaks are the ones expected for pure silver and pure palladium respectively. No peak was observed at either 39.05° or 44.86°, the expected peaks for a 50:50 solid solution of palladium and silver. Thus, it is evident that no solid solution was produced by the process taught by U.S. Pat. No. 3,390,981.

EXAMPLES 2–4

An organic liquid solution of palladium nitrate was prepared by dissolving 350 g of palladium metal in 500 mL of commercially available concentrated nitric acid. The reaction was stirred overnight and any unreacted metal was removed by filtration. The solution was then standardized. The palladium concentration was determined by weighing a 1 mL aliquot of solution and then firing the aliquot at 1000° C. for 15 minutes. After cooling, the residual metal was weighed and the percent metal of the solution was determined as well as the molarity. The hydrogen ion concentration was determined by complexing the palladium ions with an added 5 g of sodium chloride to a 1 mL aliquot of solution. The hydrogen ions were then titrated with 0.1 molar solution of sodium hydroxide using a pH meter to indicate the endpoint. In a typical experiment, the palladium concentration was about 3.5 molar and the acid concentration was about 1 to 2 molar.

An aqueous silver nitrate solution was prepared by dissolving silver bullion in commercially available concentrated nitric acid. The solution was typically 6–7 molar in silver nitrate and 0.5 molar in nitric acid.

Using the above-described stock solution of palladium nitrate, a sufficient amount of stock was used to precipitate 1 kg of an alloy containing 30 weight percent palladium. In a typical experiment, 841 mL of a stock solution containing 3.35 moles of palladium per liter of solution was combined with 991 mL of a 6.488 molar solution of silver nitrate. The resulting solution was then made up to a volume of 4 L using deionized water.

A second solution was prepared by diluting 474 mL of commercially available 13.5 molar formaldehyde solution to 4 L. This gave a solution that was 6.357/4 molar in formaldehyde. This represents a 5% molar excess of formaldehyde relative to the amount of metal to be reduced.

A third solution containing sodium hydroxide was prepared by dissolving 580 g of sodium hydroxide in 4 L of water. This is a sufficient amount to neutralize the residual acid in the metal solution, neutralize the protons released during the reaction and provide a 5% excess relative to the amount of metal to be reduced in the reaction.

The three solutions were placed in flasks. The solutions were then pumped to a reactor using peristaltic pumps. Flow meters on each of the solution lines were used to insure that the flow rates to the operating mixer were maintained at 100 mL per minute. The lines from the metal solution and the line containing the formaldehyde were joined in a simple T connection before the reactor. The sodium hydroxide and the metal and formaldehyde solutions were then pumped to the reactor. A Waring blender was used as the reaction chamber. A third line connected to the reactor removed the reacted solution from the reactor with both intake and offtake lines being located just above the mixer impeller. This solution was pumped to a holding tank. After the reaction was complete, the solution was filtered and the powder was washed on the filter until the filtrate coming through the powder was at a pH of $\leq 8$ or less. The filter cake was then dried using a freeze-dryer. Composition, yields and properties of three batches of Pd/Ag alloy made by the above-described process are given in Table 2 below:

TABLE 2

| PREPARATION OF Pd/Ag ALLOYS | | | |
|---|---|---|---|
| EXAMPLE NO. | 2 | 3 | 4 |
| Composition, % wt. | | | |
| Ag | 69.3 | 69.4 | 69.4 |
| Pd | 29.0 | 28.7 | 29.0 |
| Yield, % | 99.4 | 95.7 | 98.5 |
| Properties | | | |
| Surface Area, m$^2$/g | 17.1 | 19.0 | 18.8 |
| Particle Size, 50% point μm | 2.63 | 1.54 | 1.58 |
| X-ray Diffraction Peaks, Degrees (uKα$_1$) | 38.7 45.0 | 38.9 45.1 | 38.9 45.0 |

EXAMPLES 5–10

A series of Pd/Ag alloys was made by the method of Example 2 in which the amount of Pd was varied from 1.3 to 34.0 wt. % and the amount of reducing agent was increased accordingly. The resultant alloy compositions, yields and properties of the powders are given in Table 3 below:

TABLE 3

| PREPARATION OF Pd/Ag ALLOYS EFFECT OF INCREASING Pd CONCENTRATION | | | | | | |
|---|---|---|---|---|---|---|
| EXAMPLE NO. | 5 | 6 | 7 | 8 | 9 | 10 |
| Composition, % wt. | | | | | | |
| Ag | 97.9 | 96.7 | 94.6 | 87.5 | 78.4 | 64.6 |
| Pd | 1.3 | 2.3 | 4.2 | 11.5 | 20.1 | 34.0 |
| Yield, % | >98 | >98 | >98 | >98 | >98 | >98 |
| Properties | | | | | | |
| Surface Area, m$^2$/g | 6.0 | — | 5.7 | 6.9 | 14.1 | 18.5 |
| Particle Size, 50% point μm | 1.43 | 1.00 | 2.84 | 2.79 | 1.78 | 1.49 |

The foregoing data show that the alloys having higher levels of Pd in the alloy tended to have higher surface areas. It is interesting to note that between about 4 and 12% Pd, the alloy particles had larger particle sizes.

EXAMPLES 11–13

A further series of Pd/Cu alloys was made in the manner of Examples 2–4 except that a stoichiometric amount of hydrazine sulfate was used as the reducing agent and the amount of Cu was varied from 8.8 to 30.4%. Composition and volume of the reactant solutions were as follows:

1.0 liter aqueous solution of 164 g PdCl$_2$ and 52 g CuNO$_3$.2.5H$_2$O
1.1 liter aqueous solution of 117 g hydrazine sulfate (H$_5$N$_2$)$_2$SO$_4$)
1.1 liter aqueous solution of NaOH.

Each of the procedures produced alloyed (solid solution) particles. It was interesting to note that the Pd/Cu alloy exhibited particle surface areas 2.5 to 3 times as high as the Pd/Ag alloys. The composition and surface area of the alloys from this series are given in Table 4 below:

TABLE 4

| PREPARATION OF Pd/Cu ALLOYS | | | |
|---|---|---|---|
| EXAMPLE NO. | 11 | 12 | 13 |
| Alloy Composition, % wt. | | | |
| Cu | 30.4 | 24.3 | 8.8 |
| Pd | 69.6 | 75.7 | 85.9 |
| Properties | | | |
| Surface Area, M$^2$/g | 50.0 | 51.7 | 31.1 |

EXAMPLE 14

A still further powdered alloy was prepared by the procedure of Examples 2–4 in which Rh was alloyed with Ag. In this example, Rh$_2$O$_3$ was dissolved in an excess of aqueous HNO$_3$ and combined with the AgNO$_3$ solution and the amount of base added was sufficient to neutralize the additional acid in the RhNO$_3$/AgNO$_3$ solution. The resultant alloy contained 99.5% Ag and 0.5% Rh. The surface area of the particle was 4.3 m$^2$/g and the particle size 50% point was 1.36 μm. This alloy would be quite suitable for low conductivity Ag conductor compositions.

In all the foregoing Examples 2–14, the particulate products exhibited two x-ray diffraction peaks which were well removed from the known location of the peaks for the individual metals. Thus, it is clear that the powders produced by the process of the invention are true solid solutions.

EXAMPLES 15–19

A series of five 30/70 Pd/Ag alloy powders was prepared in the manner of Examples 2–4 in which the pH of reaction solutions was varied. As shown by the data in Table 5 below, more finely divided particles were produced at pH values above pH 9 and especially pH 9.5 and higher.

TABLE 5

| PREPARATION OF Pd/Ag ALLOYS EFFECT OF pH ON PARTICLE SIZE | |
|---|---|
| Reaction Solution | Particle Size |

TABLE 5-continued

| Example No. | pH | μm |
|---|---|---|
| 15 | 9.0 | 9.8 |
| 16 | 9.5 | 2.6 |
| 17 | 10.0 | 1.7 |
| 18 | 10.5 | 1.4 |
| 19 | 11.0 | 1.2 |

Example 20 Three aqueous solutions were formed having the following compositions:

| Solution A | |
|---|---|
| $RuCl_3 \cdot xH_2O$ | 160 g (0.674 mole) |
| Conc. $HNO_3$ | 90 ml |
| $Bi(NO_3)_3 \cdot 5H_2O$ | 327 g (0.674 mole) |
| Deionized $H_2O$ | To 1 liter |
| Solution B | |
| 50% wt. aqueous NaOH | 462 g |
| Deionized $H_2O$ | To 0.5 liter |
| Solution C | |
| 31.8% wt. $H_2O_2$ | 31 g |
| Deionized $H_2O$ | To 0.5 liter |

Using the same equipment as for Examples 2–4, Solution A was pumped into the mixer at a rate of 100 mL/min. and simultaneously Solutions B and C were each pumped separately into the mixer at a rate of 50 mL/min. As in previous Examples 2–4, the mixer was operating with an energy dissipation level in excess of 200 Joules/sec/liter.

Using the same procedure as Examples 2–4, the reaction solution was filtered, the resultant powder was washed to obtain a filtrate pH of $\leq 8$ and then freeze dried. The product consisted of 242 g of amorphous $Bi_2Ru_2O_7$ having a surface area of 110 m$^2$/g. Examination of the product by x-ray diffraction after it was crystallized by calcining at 700° C. for 0.5 hour revealed only the diffraction pattern typical of pyrochlore structures and none for either $RuO_2$ or $Bi_2O_3$.

EXAMPLE 21

Three aquaeous solutions were formed having the following compositions:

| Solution A | |
|---|---|
| $RuCl_3 \cdot xH_2O$ | 72.9 g (0.304 mole) |
| Conc. $HNO_3$ | 100 ml |
| $Cu(NO_3)_2 \cdot 2.5H_2O$ | 17.7 g (0.076 mole) |
| $Bi_2O_3$ | 53.3 g (0.114 mole) |
| Deionized $H_2O$ | To 1.0 liter |
| Solution B | |
| 50% wt. aqueous NaOH | 217 g |
| Deionized $H_2O$ | To 1.0 liter |
| Solution C | |
| 31.9% wt. $H_2O_2$ | 9.5 g |
| Deionized $H_2O$ | To 1.0 liter |

Using the same equipment as for Examples 2–4, Solutions A, B and C were simultaneously pumped into the mixer each at a rate of 100 mL/min. As in previous Examples 2–4, the mixer was operating with an energy dissipation level in excess of 200 Joules/sec/liter.

Using the same procedure as Examples 2–4, the reaction solution was filtered, the resultant powder was washed to obtain a filtrate pH of $\leq 8$ and then freeze dried. The product consisted of amorphous $Cu_2Bi_2Ru_8O_{27}$. Examination of the product by x-ray diffraction after it was crystallized by calcining at 700° C. for 0.5 hour revealed only the diffraction pattern typical of pyrochlore structures and none for any of the three starting oxides.

EXAMPLE 22

Three aqueous solutions were formed having the following composition:

| Solution A | |
|---|---|
| $RuCl_3 \cdot xH_2O$ | 80.1 g (0.333 mole) |
| Conc. $HNO_3$ | 109 ml |
| $Gd_2O_3$ | 61.1 g (0.169 mole) |
| Deionized $H_2O$ | To 1 liter |
| Solution B | |
| 50% wt. aqueous NaOH | 230 g |
| Deionized $H_2O$ | To 0.5 liter |
| Solution C | |
| 31.8% wt. $H_2O_2$ | 38.2 g |
| Deionized $H_2O$ | To 0.5 liter |

Using the same equipment as for Examples 2–4, Solutions A, B and C were pumped into the mixer, each at a rate of 100 mL/min separately into the mixer at a rate of 50 mL/min. As in previous Examples 2–4, the mixer was operating with an energy dissipation level in excess of 200 Joules/sec/liter.

Using the same procedure as Examples 2–4, the reaction solution was filtered, the resultant powder was washed to obtain a filtrate pH of $\leq 8$ and then freeze dried. The product consisted of amorphous $Gd_2Ru_2O_7$ and was obtained at a yield of nearly 100%.

I claim:

1. A process for forming a solid solution of two or more metals or metal oxides by ionic reaction and simultaneous precipitation from the reaction medium comprising the steps of:
   a. in a high intensity mixing apparatus, forming a microdispersion of (1) an aqueous liquid solution of the metal ions and (2) at least a stoichiometric amount relative to the dissolved metal ions of a fluid co-reactant which is soluble in the aqueous solvent for the metals to effect liquid phase reactions between the dissolved metal ions and the fluid co-reactant, the rates of which reactions are pH sensitive, and formation in the liquid phase of the metals, the rate of forming the microdispersion being faster than the ionic reactions:
   b. simultaneously adjusting the pH of the microdispersion as necessary to maintain the reaction between the metal ions and the coreactant at a rate faster than the rate of precipitation of metals from the reaction medium;
   c. maintaining the microdispersion for a time sufficient to effect simultaneous precipitation of the formed metals or metal oxides and formation of finely divided particles of a single solid solution of the metals having the proportions of the initial metal reactants and dispersion in the reaction medium of the finely divided solid solution particles;
   d. removing reaction medium containing the dispersed solid solution particles from the mixing apparatus; and
   e. separating the particles of solid solution of the metals or metal oxides from the removed reaction medium.

2. The process of claim 1 in which one component of the solid solution is silver metal and in step A, the liquid ionic solution is free of halides and the fluid co-reactant is a reductant and in step B the pH is maintained at a level of at least 11 by the addition of an hydroxide of an alkali or alkaline earth metal.

3. The process of claim 2 in which the solid solution is an alloy of silver and palladium.

4. The process of claim 2 in which the reductant is formaldehyde.

5. The process of claim 1 in which one component of the solid solution is palladium metal and in step A, the reactant fluid is a reductant and in step B, the pH is maintained at a level of at least 11 by the addition of an hydroxide of an alkali or alkaline earth metal.

6. The process of claim 5 in which the solid solution is an alloy of palladium and copper.

7. The process of claim 6 in which the reductant is hydrazine.

8. A process for forming a solid solution of two or more metal oxides by ionic reaction and simultaneous precipitation from the reaction medium comprising the steps of:
   a. in a high intensity mixing apparatus, forming a microdispersion of (1) an aqueous liquid solution of metal oxide and metal oxide ions and (2) at least a stoichiometric amount relative to the dissolved metal oxide and metal oxide ions of a fluid co-reactant which is soluble in the aqueous solvent for the metal oxides to effect liquid phase reactions between the dissolved metal oxide ions and the fluid co-reactant, the rates of which reactions are pH sensitive, and formation in the liquid phase of the metal oxides, the rate of forming the microdispersion being faster than the ionic reactions;
   b. simultaneously adjusting the pH of the microdispersion as necessary to maintain the reaction between the metal oxide ions and the coreactant at a rate faster than the rate of precipitation of metal oxides from the reaction medium;
   c. maintaining the microdispersion for a time sufficient to effect simultaneous precipitation of the formed metal oxides and formation of finely divided particles of a single solid solution of the metal oxides having the proportions of the initial metal oxide reactants and dispersion in the reaction medium of the finely divided solid solution particles;
   d. removing reaction medium containing the dispersed solid solution particles from the mixing apparatus; and
   e. separating the particles of solid solution of the metals or metal oxides from the removed reaction medium.

9. The process of claim 8 in which one component of the solid solution is $RuO_2$ and another component is selected from the group consisting of bismuth oxide, lead oxide and mixtures thereof, and the solid solution is a ruthenate of bismuth, lead or mixtures thereof having a pyrochlore-type structure.

10. The process of claim 8 in which one component of the solid solution is $RuO_2$ and another component is selected from the group consisting of copper oxide, bismuth oxide, gadolinium oxide, lead oxide and mixtures thereof, and the solid solution is a ruthenate of bismuth, lead or mixtures thereof having a pyrochlore-type structure.

11. A process for forming a solid solution of two or more metals or metal oxides by ionic reaction and simultaneous precipitation from the reaction medium comprising the steps of:
   a. in a high intensity mixing apparatus, forming a microdispersion of (1) an aqueous liquid solution of the metal ions and (2) at least a stoichiometric amount relative to the dissolved metal ions of a fluid co-reactant, which is soluble in the aqueous solvent for the metals, to effect liquid phase reactions between the dissolved metal ions and the fluid co-reactant, the rates of which reactions are pH sensitive, and formation in the liquid phase of the metals or metal oxides, the rate of forming the microdispersion being faster than the ionic reactions;
   b. simultaneously adjusting the pH of the microdispersion as necessary to maintain the reaction between the metal ions and the coreactant at a rate faster than the rate of precipitation of metals or metal oxides from the reaction medium;
   c. maintaining the microdispersion for a time sufficient to effect simultaneous precipitation of the formed metals or metal oxides and formation of finely divided particles of a single solid solution of the metals or metal oxides having the proportions of the initial metal or metal oxide reactants and dispersion in the reaction medium of the finely divided solid solution particles;
   d. removing reaction medium containing the dispersed solid solution particles from the mixing apparatus; and
   e. separating the particles of solid solution of the metals or metal oxides from the removed reaction medium.

12. The process of claim 11 in which the recovered particles from Step E are heated to at least 300° C. but below the melting point of the solid solution to effect reduction of the surface area of the particles.

* * * * *